United States Patent
Fontaine et al.

(10) Patent No.: US 11,888,737 B1
(45) Date of Patent: Jan. 30, 2024

(54) IMPLEMENTING NETWORK FUNCTION LOGIC IN A VIRTUAL SWITCH

(71) Applicant: Red Hat, Inc., Raleigh, NC (US)

(72) Inventors: Christophe Fontaine, Puteaux (FR); Saravanan K R, Bangalore (IN); David Marchand, Puteaux (FR); Maxime Coquelin, Puteaux (FR)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/877,184

(22) Filed: Jul. 29, 2022

(51) Int. Cl.
*H04L 45/586* (2022.01)
*H04L 45/00* (2022.01)
*H04L 49/00* (2022.01)

(52) U.S. Cl.
CPC .......... *H04L 45/586* (2013.01); *H04L 45/566* (2013.01); *H04L 49/70* (2013.01)

(58) Field of Classification Search
CPC ..... H04L 45/586; H04L 45/566; H04L 49/70; H04L 45/00; H04L 45/76; H04L 69/22
See application file for complete search history.

(56) References Cited

U.S. PATENT DOCUMENTS

| | | | |
|---|---|---|---|
| 7,830,882 B2 | 11/2010 | Johnson | |
| 7,869,439 B1 | 1/2011 | Ramberg et al. | |
| 9,185,056 B2 | 11/2015 | Adams et al. | |
| 9,356,866 B1 * | 5/2016 | Sivaramakrishnan | .. H04L 45/50 |
| 10,237,354 B2 * | 3/2019 | Jani | ........ H04L 67/10 |
| 10,873,636 B2 | 12/2020 | Boon et al. | |
| 11,108,687 B1 * | 8/2021 | Hawkins | ........ H04L 45/38 |
| 11,150,963 B2 * | 10/2021 | Nainar | ...... G06F 9/45558 |
| 2016/0173338 A1 * | 6/2016 | Wolting | ........ H04L 41/12 |
| | | | 709/223 |
| 2017/0177396 A1 * | 6/2017 | Palermo | ...... G06F 9/45558 |
| 2017/0214612 A1 * | 7/2017 | Leitner | ...... H04L 49/9036 |
| 2018/0262599 A1 * | 9/2018 | Firestone | ...... H04L 47/2441 |
| 2020/0314694 A1 * | 10/2020 | Yu | ........... H04L 45/74 |

(Continued)

OTHER PUBLICATIONS

Eugenio Perez Martin "Deep dive into Virtio-networking and vhost-net" Red Hat Blog, Sep. 12, 2019.

(Continued)

*Primary Examiner* — Alina A Boutah
(74) *Attorney, Agent, or Firm* — Womble Bond Dickinson (US) LLP

(57) ABSTRACT

Techniques for configuring a packet session are disclosed. An example method includes receiving, at a network function, a packet from a virtual connection device. The method also includes identifying, by the network function, an action to perform on the packet and modifying the header based on the action to create a modified packet with a modified header. The method also includes copying the modified packet from the network function to the virtual connection device for the virtual connection device to perform the action on the modified packet based on the modified header. The method also includes configuring, by a processing device executing the network function, the virtual connection device to perform the action on subsequent packets of the packet session. The virtual connection device performs the action on the subsequent packets without copying the subsequent packets to the network function.

20 Claims, 6 Drawing Sheets

(56) References Cited

U.S. PATENT DOCUMENTS

2020/0344171 A1* 10/2020 Sharma .................. H04L 47/20
2022/0263757 A1* 8/2022 Miyashita ............... H04L 45/74

OTHER PUBLICATIONS

Anthony J. Nicholson et al. "Juggler: Virtual Networks for Fun and Profit" IEEE Transactions on Mobile Computing vol. 9, Issue 1, May 26, 2009.

Sapan Bhatia et al. "Trellis: A Platform for Building Flexible, Fast Virtual Networks on Commodity Hardware" Proceedings of the 2008 ACM CoNEXT Conference, 2008.

* cited by examiner

IMPLEMENTING NETWORK FUNCTION LOGIC IN A VIRTUAL SWITCH

TECHNICAL FIELD

Aspects of the present disclosure relate to virtual networks, and more particularly, to performing network functions as part of a network.

BACKGROUND

A computer network may include various computing devices that may communicate with one another through network switches, routers, and other network devices. The connections between devices may be established through switches, routers, and other network devices. In some networks, one or more network devices may be implemented as virtual devices such as virtual switches, for example. Some network services may also be provided by applications that provide software virtualization of network services. Such applications, sometimes referred to as network functions or virtual network functions, may be implemented as virtual machines or a containers performing the operations of a specially designed hardware component.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
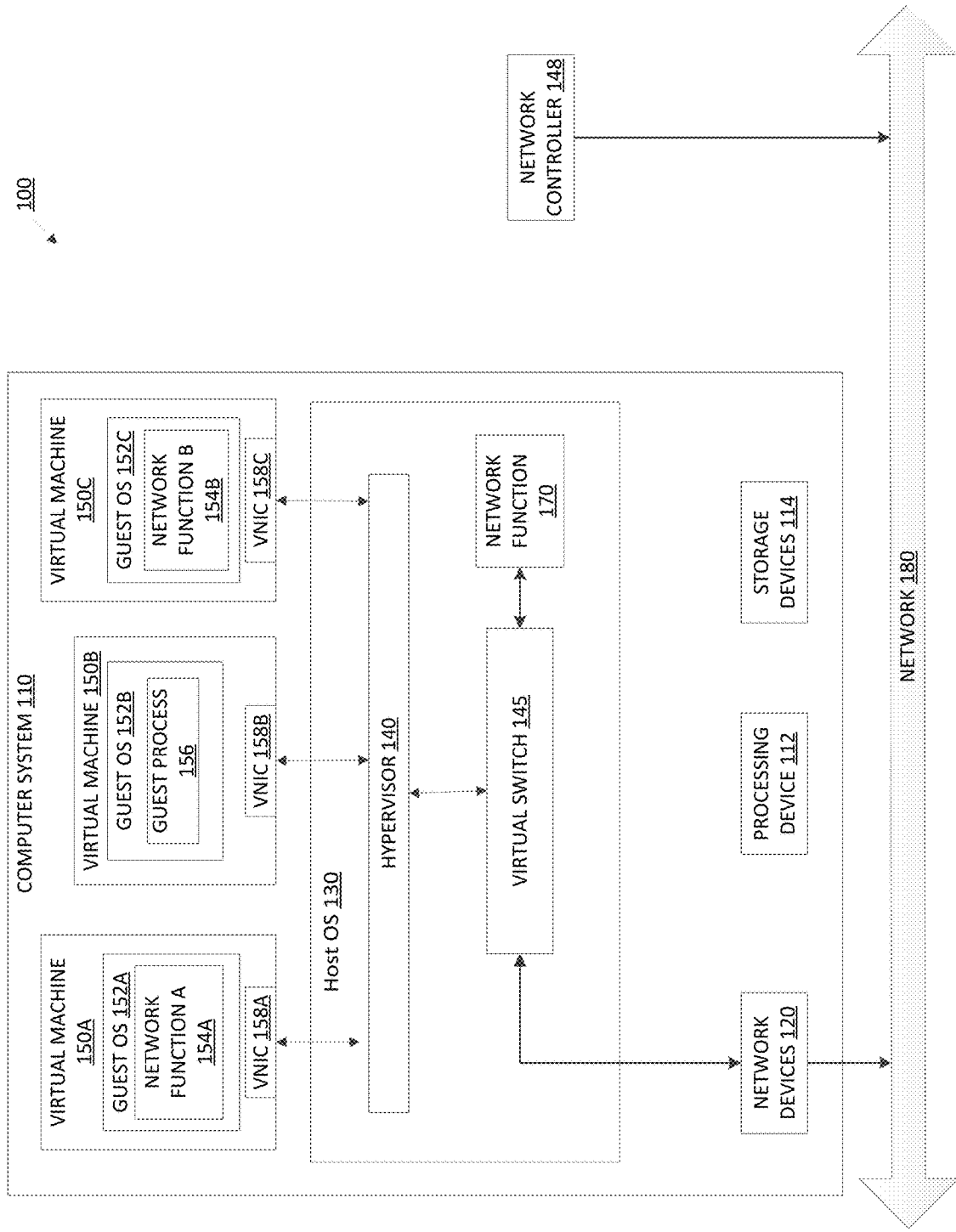
FIG. 1 is a block diagram depicting an example of a computing system implementing various network functions invoked through a virtual switch, in accordance with embodiments of the present disclosure.

A software defined network (SDN) provides abstraction of elements in a network to provide control of the network through a network controller. A SDN separates the data plane of the network from the control plane. The data plane distributes traffic to specific destinations according to a set of rules, whereas the control plane is used to configure the rules that define the distribution of traffic. The SDN may include a network controller that sends packet handling rules to switches in the network. For example, the network controller may determine network configuration rules for a switch that tell the switch where to forward packets received at the switch based on matching the packets to entries in a configuration file or distribution table.

In some SDNs one or more network devices may be implemented as virtual devices such as virtual switches, for example. A virtual switch provides virtualization of physical switch components to virtual machines. The virtual machines interface with the virtual switch through ports on the virtual switch and virtual network interface cards of the virtual machines. The virtual switch can then forward communications from a virtual machine to another location on the virtual network such as another virtual machine. The virtual switch may also connect to a physical network interface card to provide access to a physical network for the virtual machines.

Networks may include various components to provide network services. Network services may include, network address translation (NAT), firewalling, intrusion detection, domain name service (DNS), caching, compression, encryption, decompression, decryption, routing, switching, load balancing, denial-of-service protection, packet inspection, policy management and other components that communicate, analyze, or manipulate data on a computer network. Network services may be implemented with specifically designed hardware. For example, a firewall may be implemented as a specially designed network component to perform firewall operations.

Some network services may also be provided by applications that provide software virtualization of network services. Such applications, sometimes referred to as network functions or virtual network functions, may be implemented as a virtual machine or a container performing the operations of a specially designed hardware component. The network functions may be accessed by forwarding a packet from a virtual switch to the virtual machine or container hosting the network function. Network functions may modify a packet and return the packet to the virtual switch.

Communicating with network functions may result in added delays in processing a packet. For example, if the network function is implemented in a virtual machine, the virtual switch may forward packets to the network function through a socket connection to a virtual network interface card of the virtual machine. Forwarding the packet from the virtual switch to a network function on a virtual machine may result in several context switches by the computing system. Such context switches can slow the operation of the computer system and may result in delays in processing packets.

In some cases, both the virtual switch and the network functions may reside in the user-space of the host operating system. In this case, packets can be transferred between the virtual switch and the network functions without causing context switches. However, in this scenario, communication between the virtual switch and the network functions will still be subject to the delays caused by the copying of data packets between the virtual switch and the network functions. These delays are multiplied if each packet of a packet session is to be copied from the virtual switch to the network function and back again.

In some cases, the network function may request the network controller to configure a packet session by instructing the virtual switch regarding the handling of certain data packets. For example, a network function could send a request to the network controller to command the virtual switch to forward a particular packet session to a specified destination. Once the request is fulfilled, the virtual switch can forward the data packets as instructed without involvement of the network function, thereby eliminating additional context switches and/or copy operations for that packet session. This can help to improve communication efficiency. However, the delay involved in configuring the packet session through the network controller can be substantial since, in most cases, the network controller will not reside within the same host system as the virtual switch. Additionally, such techniques are usually domain specific (i.e., applied to the entire network) and too broad. For example, the border gateway protocol (BGP) flow spec allows a network administrator to divert and/or block incoming distributed denial-of-service (DDOS) attacks through the network controller.

The present disclosure provides a more efficient communication mechanism in which some operations performed by network functions for packet processing are offloaded to the virtual switch. Rather than configuring a packet session through the network controller (e.g., SDN controller), the network function is able to configure the packet session through direct communication with the virtual switch. In some instances, the network function can make a decision about a packet session after processing a small number of initial packets. The network function can then send instructions to the virtual switch instructing the virtual switch how to process additional packets of the packet session. For example, the network function may send forwarding instructions to the virtual switch instructing the virtual switch to forward packets to a particular destination or to block packets.

Enabling the network function to offload actions to the underlying virtual switch improves efficiency by eliminating the two copy events that would otherwise occur between the virtual switch and the network function for each remaining packet of the packet session. Fewer copy events result in fewer CPU processing cycles and less RAM consumption, and may also eliminate the context switch that sometimes occurs, which further enhances efficiency. Avoiding these extra copy events can increase the performance of a computing network, either by increasing the capacity of a network function, or by reducing the number of dedicated CPUs used for processing packets.

Additionally, allowing the network function to directly control the virtual switch without having to go through network controller also has other advantages. In many cases, the network controller will not reside on the same host as the virtual switch. This can contribute to communication latency of up to several tens of milliseconds. Thus, for short duration packet sessions, much of the efficiency that could be gained is lost due to communication delays. Additionally, the network controller usually applies generally applicable rules over the entire network. By contrast, the packet session offload techniques described herein allow the network function to control packet sessions on a much more granular level. For example, the network controller can implement rules that apply only to the local data plane, e.g., to a particular compute node.

FIG. 1 is a block diagram 100 depicting an example of a computing system 110 implementing various network functions invoked through a virtual switch 145, in accordance with embodiments of the present disclosure. The computing system 110 may include various hardware components including a processing device 112, storage devices 114, input/output device, drivers, network devices 120 (for example, physical switches or other network devices), or the like. The storage devices 114 may be non-volatile memory, such as a hard disk drive, tape drive, flash memory, optical disc drive or the like. The computing system 110 may be a personal computer (PC), server computer, mainframe, handheld device, portable computer, set-top box or any other computing system.

In the example block diagram illustrated in FIG. 1, the computing system 110 executes a hypervisor 140 within a host operating system 130. The host operating system 130 may include a kernel based virtual machine (KVM) which operates as the hypervisor 140. The host operating system 130 may include a user-space and a kernel-space. The host operating system executes one or more applications in the user-space such as a virtual switch 145 and network functions 170, while the kernel-space is reserved for core operations of the operating system. The hypervisor 140 may also monitor one or more virtual machines 150A-150C operating on the computer system 110. In some implementations, the hypervisor 140 may operate directly on the hardware of the computer system 110 instead of operating within a host operating system 130.

In some examples, the computer system may execute a KVM on the host operating system 130 as the hypervisor 140. The hypervisor 140 may then operate the virtual machines 150A-150C. One or more of the virtual machines may be executed as Quick Emulator (QEMU) on the computer system 110. In some embodiments, the virtual switch 145 may be an Open vSwitch. The virtual switch 145 may operate in conjunction with a network controller 148 to manage network communications. In some embodiments, the network controller 148 is an SDN controller such as an OpenFlow network controller. In some cases, the network controller 148 may reside within the same host OS 130 as the virtual switch 145. However, in the embodiment shown in FIG. 1, the network controller 148 resides in a different host space of a different computing device within the network.

The hypervisor 140 may present to other software applications the abstraction of underlying hardware of one or more virtual machines 150A-150C, which execute guest operating systems 152A-152C. The virtual machines 150A-150C use the underlying hardware of the computer system 110 to emulate hardware devices of a computer system. The virtual machines 150A-150C may then appear as physical machines to applications executing on the operating systems of the virtual machines.

Guest operating systems operating on the virtual machines may be the same or different from one another. Virtual machines 150A and 150C execute network functions 154A and 154B on their respective guest operating systems. Network functions 154A and 154B may be invoked by virtual switch 145 by forwarding packets to the virtual network cards 158A and 158C of the virtual machines. Network functions 154A and 154B may perform operations of different network services. In some examples, network functions 154A and 154B may perform operations of the same network services, but may be implemented on multiple virtual machines due to load on one of the virtual machines 150A and 150C, or multiple virtual machines may be instantiated by network controller 148 to optimize network traffic.

In addition to virtual machines performing network functions, virtual machine 150B executes a guest process 156 on the associated guest operating system. The guest process 156 may consume and generate packets distributed in the network. Although shown as operating a single process or network function on each of the virtual machines, in some implementations, one or more of the virtual machines may execute more processes in their respective guest operating systems. In addition, the computing system 110 may execute fewer virtual machines, for example, zero, one, or two, or the computing system 110 may execute more virtual machines than are shown in FIG. 1.

The virtual machines 150A-150C may communicate with other physical or virtual network locations through virtual network interface cards (vNICs) 158A-158C. The vNIC may have associated IP and MAC addresses and may communicate with other network devices or locations through the virtual switch 145. The virtual switch 145 may emulate physical hardware of a switch to the virtual machines operating on computer system 110. The virtual switch 145 may forward packets from one virtual machine to other virtual machines and physical locations outside of the computer system 110 through network devices 120 that can connect to a network 180. For example, the network devices 120 may include a physical network interface card (NIC).

Some of the network functions carried out on virtual machines may be complex, requiring particular operating systems and may use additional overhead due to the operation of the virtual machine compared to those carried out on the hypervisor 140. For example, data passed from the virtual switch 145 to a virtual machine 150A may cause the host operating system to perform several context switches to move the data from the virtual switch 145, into the kernel of the host operating system 130, then into the guest operating system 152A operating on a virtual machine 150A through the vNIC 158A, before reaching the destination network function 154A. After the network function 154A performs its operations, the process is reversed to return the processed packet to the virtual switch 145 before forwarding the packet to a next network location. The context switching to perform such network functions slows the operation of the data path. Such context switching may be too slow for communications that are particularly latency sensitive. In order to chain multiple network functions running on multiple virtual machines, a packet may be passed from one to the other through virtual switch 145, which results in multiple communications from the virtual switch 145 to various virtual machines to complete the chain of network functions.

The network function 170 operating within the host OS 130 may communicate with the virtual switch 145 without the resulting context switching from passing data packets to a virtual machine. Although a single network function 170 is shown as operating within the host OS 130, it will be appreciated that the host OS could include any number of network functions 170. In some embodiments, network functions 170 may be executed within a container. Network function 170 operating within the host OS 130 may be simpler than those operating on separate virtual machines. For example, the network function 170 may not require virtualization of particular hardware elements for operations, may tie up fewer resources, or may otherwise be suitable for performance as an application on hypervisor 140. The virtual switch 145 may inspect incoming packets and forward packets to one or more designated ports as appropriate. Packets passed to a network function 170 residing in the host OS 130 may be communicated to network function 170 through several possible mechanisms, such as by passing temporary files, through sockets, pipes, shared memory, or other communication mechanisms.

In some implementations, simple network functions that do not use specialized hardware may operate within the host OS 130, while more complicated network functions that could take advantage of the additional virtual structure may be operated on a virtual machine. For example, computationally intensive network functions such as firewalls, intrusion detection, denial-of-service protection, and the like may be instantiated on a virtual machine to provide adequate processing hardware and individual resources to the network functions. On the other hand, simple network functions such as NAT, compression, encryption, decompression, routing, load balancing, and the like may be performed by applications operating in the user-space of the host operating system 130.

The virtual switch 145 may make packet forwarding decisions based decisions based on the header information of the packets. For example, the virtual switch 145 may access configuration files that determine where to forward packets having a particular destination address. In some cases, the configuration files may be set, in part, by the network controller 148. Network functions 154A and 154B may be invoked by the virtual switch 145 by forwarding packets to the virtual network cards 158A and 158C of the virtual machines according to rules, which may be set by the network controller 148.

In some instances, several packets of a packet session may be received by the virtual switch 145 from the network 180 through the network device 120. The virtual switch 145 may determine, based on the header information and/or configuration files, that the packets of the packet session should be sent to a designated one of the network functions 170, 154A, and 154B. The designated network function processes the packet and determines that the packet should be forwarded to another network device, which may be another network function, the guest process 156, or a remote network device accessible through the network 180. The designated network function then copies the packet back to the virtual switch 145 with instructions to forward the packet to the destination address specified by the network function. The network function can instruct the virtual switch 145 by modifying the packet header before copying the packet back to the virtual switch 145. The virtual switch 145 then sends the packet to the relevant destination address inserted into the header by the network function. This process may be repeated for each of the packets of the packet session.

To reduce communication latency, the virtual switch 145 can be reconfigured to automatically send new packets of the same packet session to the destination address specified by the network function automatically without first sending the packet to the network function. This can be accomplished by the network function sending a request to the network controller 148 to reconfigure the virtual switch 145. However, this would involve communication over the network 180, and the latency of the communication path will be relatively high. In accordance with present techniques, the network function (170, 154A, or 154B) can configure the network switch 145 by sending the relevant instructions to the virtual switch 145 directly, for example, through a separate control plane connecting the network function and the virtual switch 145. In other words, the network functions can configure the network switch 145 without involving the network controller 148.

Once the virtual switch 145 is reconfigured by the network function, the virtual switch 145 can forward any new packets of the packet session according to rules defined by the network function. For example, upon receiving a packet from the network device 120 that is part of the same packet session, the virtual switch 145 can forward the packet to the designated destination (e.g., a different network function, the guest process 156, or another network device accessible through the network 180). This behavior of the virtual switch 145 may be based on the network configuration set up by the network function 170. Packets received after the first packet (or first few packets) with a similar header that matches a pattern defined by the network function 170 may be forwarded by the virtual switch 145 in the same manner as the first packet without additional processing by the network function.

The system 100 is described in relation to the use of a virtual switch 145. However, it will be appreciated the techniques described herein can also be applied to a virtual router. Like the virtual switch 145, a virtual router can be executing in the user space of the host OS 130, and can be configured by the network controller 148 or by the network function 170, 154A or 154B directly. Additionally, the techniques may be applied to other types of network functions besides packet forwarding. For example, to implement a firewall, the network function can be configured to instruct the virtual switch 145 to block or divert the subsequent packets of the same packet session. It will be appreciated that various additional alterations may be made to the system 100 and that some components may be omitted or added without departing from the scope of the disclosure.

Figure 2:
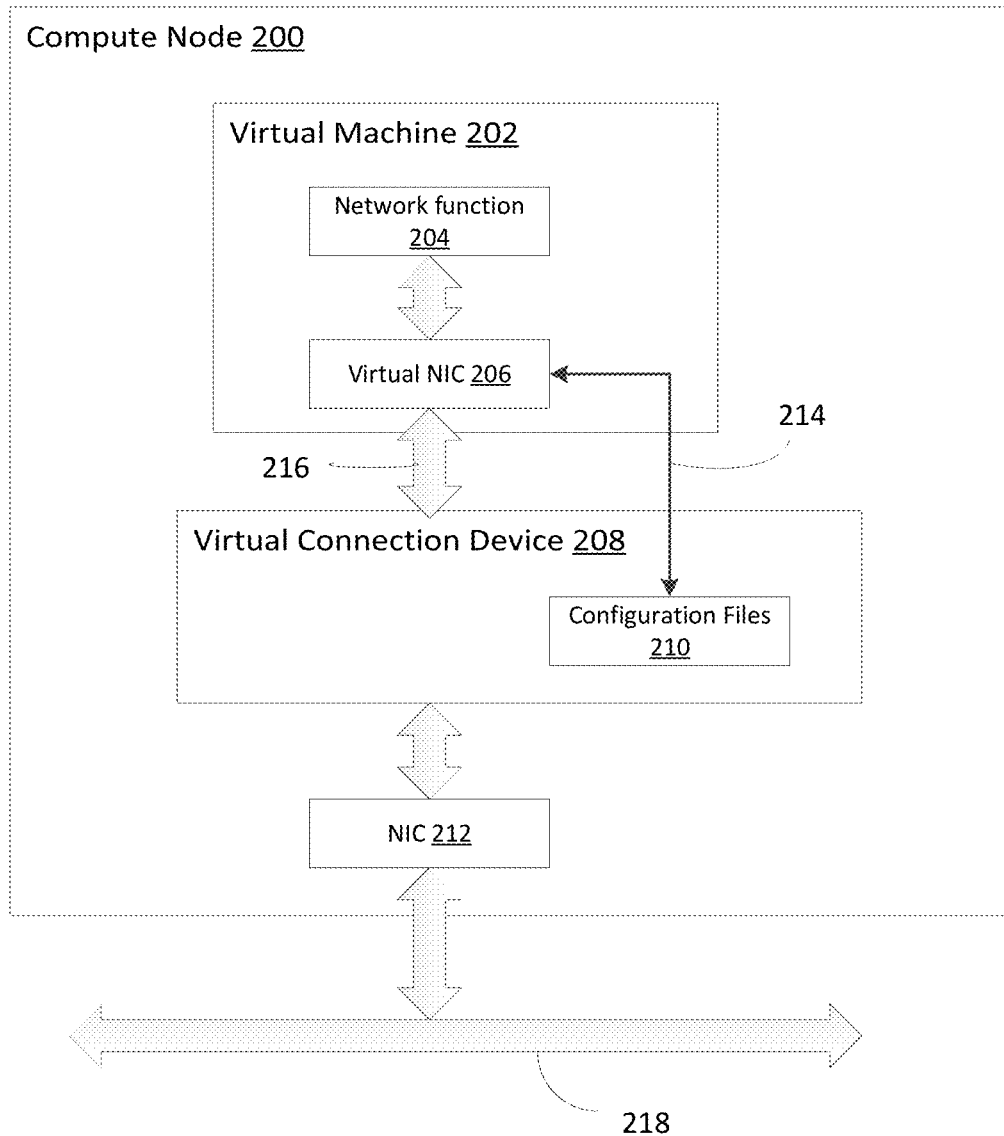
FIG. 2 is a block diagram of a compute node with a network function and a virtual connection device, in accordance with embodiments.

FIG. 2 is a block diagram of a compute node with a network function and a virtual connection device, in accordance with embodiments. The compute node 200 may be a processing device such as the computing device 100 of FIG. 1. The compute node 200 includes a virtual machine 202 that executes a network function 204, sometimes referred to as a virtual network function. The network function 204 may be configured to perform any suitable type of network service and may be configured to emulate the behavior of a physical network device. For example, the network function 204 may be configured to perform network address translation (NAT), firewalling, intrusion detection, domain name service (DNS), caching, compression, encryption, decompression, decryption, routing, switching, load balancing, denial-of-service protection, packet inspection, policy management and other services. The virtual machine 202 also executes a virtual network interface card 206, sometimes referred to as an emulated network interface card.

The compute node 200 also includes a virtual connection device 208, which may be a virtual switch such as the virtual switch 145 of FIG. 1 or a virtual router, for example. The virtual connection device 208 may be operating in the user space of the compute node's host operating system, such that data copied between the virtual machine 202 and the virtual connection device results in several context switches. For example, forwarding a packet from by the virtual switch may invoke a context switch to the kernel space of the host operating system and a second context switch to pass the packet to the virtual network interface card of the virtual machine. When the network function has performed its operations on the packet, the packet may be returned to the virtual switch through the reverse operations resulting in additional context switches.

The virtual connection devices 208 can include or have access to one or more configuration files 210 (e.g., tables) for configuring the behavior of the virtual connection device 208. For example, the configuration files 210 may include table entries that associate particular header information to a particular action to be taken for those packets with matching header information, such as blocking the packet or re-routing the packet to a new destination. Both the source and the destination may be characterized by particular IP addresses, MAC addresses, and other information. The virtual connection device 208 can be coupled to a network 218 through a physical network interface card 212.

As explained in relation to FIG. 1, the network function 204 can configure the virtual connection device 208 to process packets without further involvement of the network function 204, thereby eliminating the copy operations between the network function 204 and the virtual connection device 208 (i.e., between the virtual machine 202 and the virtual connection device 208).

In some embodiments, the configuration of the virtual connection device 208 can be performed through a side channel of the virtual NIC 206. The side channel 214 may be a control plane component, which is the part of the network that controls how data packets are sent from one place to another over the data plane. The side channel 214 of the virtual NIC 206 can be used to define the actions to take when packets belonging to a specific packet session arrive to the virtual connection device 208. For example, the virtual NIC 206 can send control signals to the virtual connection device 208, which directly affects the information stored to the configuration files 210. If the virtual connection device 208 is a type of virtual switch known as OpenVSwitch, the information stored to the configuration files 210 may be an OpenFlow rule.

The configuration information from network function 204 can be stored directly to the configuration files 210 without involvement of a network controller. In fact, the configuration information from network function 204 may overwrite configuration information previously set by a network controller. The side channel 214 can also be used to report packet session statistics back to the network function 204, such as the data throughput and others.

In some embodiments, the path of the first packet or first few packets of a packet session may be from the network 218 to the NIC 212, to the virtual connection device 208, to the network function 204 through the virtual NIC 206, back to the virtual network device 208 through the virtual NIC 206, then back to the network 218 through the NIC 212. Along in incoming path, the virtual connection device 208 directs the packet to the network function based, at least in part, on the packet header information of the received packet. The network function 204 can reroute the packet by modifying this header information before returning the modified packet back to the virtual connection device 208.

After the first packet or first few packets of the packet session are processed by the network function 204, the network function 204 can then instruct the virtual connection device 208, through the side channel 214 of the virtual NIC 206, to forward all packets belonging to the same session to the appropriate destination by, for example, associating the source and destination addresses in the configuration files 210. Subsequent packets received by the virtual connection device 208 after the reconfiguration will follow a path from the NIC 212 to the virtual connection device 208, then back to the NIC 212 to be delivered to the destination through the network 218. The virtual connection device 208 can reroute the packet by modifying this header information to replace the original destination address with the destination address set by the network function 204 and retrieved from the configuration files 210.

It will also be appreciated that the compute node 200 includes physical hardware such as processors, volatile memory, storage devices, and others. It will be appreciated that various alterations may be made to the compute node 200 and that some components may be omitted or added without departing from the scope of the disclosure.

Figure 3:
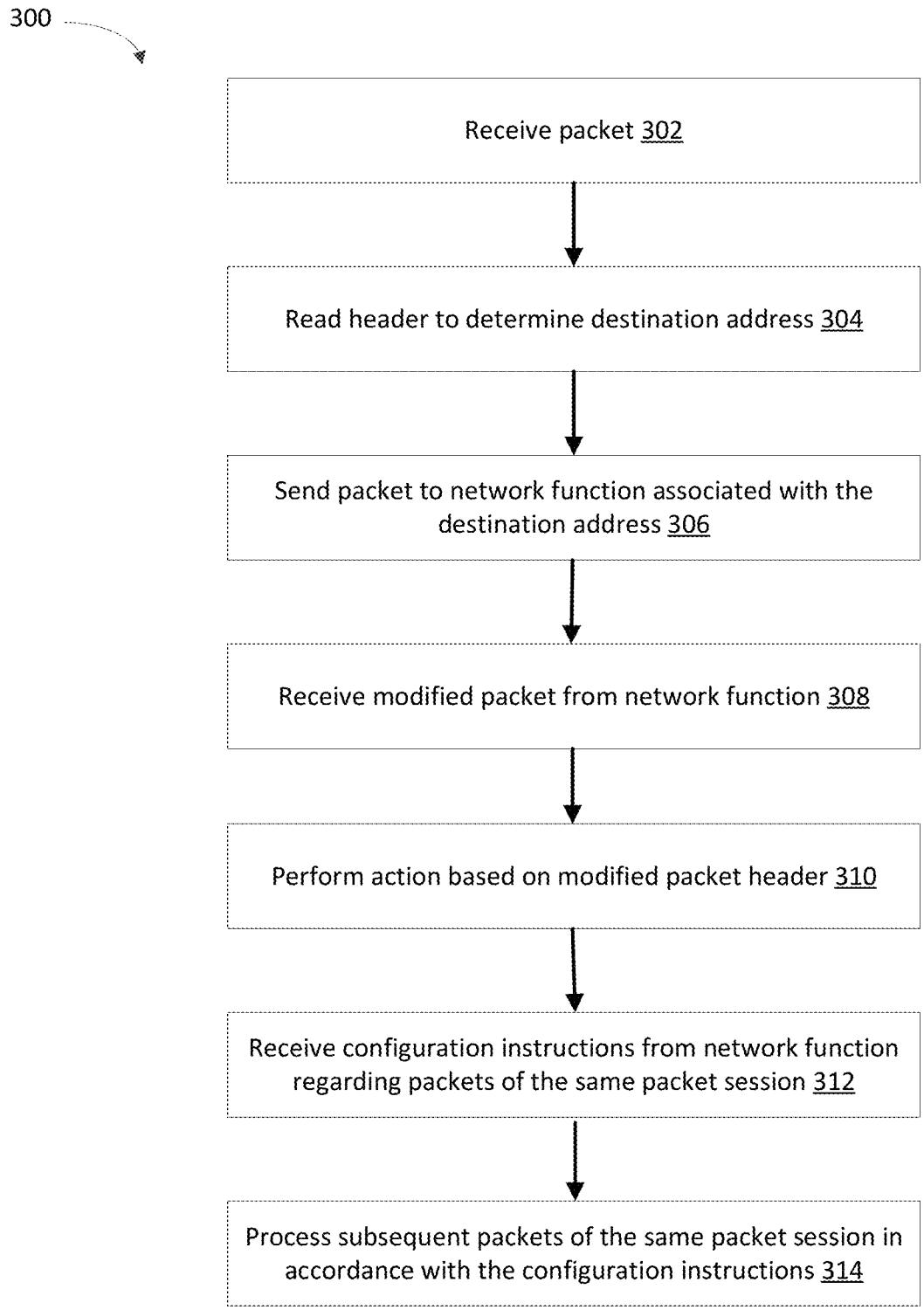
FIG. 3 is a process flow diagram of a method of configuring a packet session, in accordance with embodiments.

FIG. 3 is a process flow diagram 300 of a method of configuring a packet session, in accordance with embodiments. Method 300 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 300 may be performed by the virtual switch 145 of FIG. 1 or the virtual connection device 208 of FIG. 2. The method may begin at block 302.

At block 302, a packet is received at a virtual connection device such as a virtual switch or virtual router. The packet may include a header and a payload. The header may include a source address and a destination address.

At block 304, the packet header is read to identify a destination address for the packet.

At block 306, the packet is copied to a network function associated with the destination address. The packet may be copied to the network function over a data plane between the network function and the virtual connection device. The network function processes the packet to determine an action to be performed on the packet as described, for example, in relation to FIG. 4.

At block 308, a modified packet is received from the network function, e.g., over the same data plane. The modified packet may have a modified header that described the action to be performed on the packet. For example, the modified header may describe a new destination address or may indicate that the packet is to be blocked, e.g. discarded or diverted.

At block 310, the action indicated by header information is performed, e.g., the packet is blocked or sent to the new destination address.

At block 312, configuration instructions are received from the network function. The configuration instructions may be received over a control plane between the network function and the virtual connection device. For example, the control plane may be implemented over a side channel of a virtual NIC.

At block 314, subsequent packets that are a part of the same packet session are processed in accordance with the configuration instructions received from the network function instead of copying the packets to the network function.

It will be appreciated that embodiments of the method 300 may include additional blocks not shown in FIG. 3 and that some of the blocks shown in FIG. 3 may be omitted. Additionally, the processes associated with blocks 302 through 314 may be performed in a different order than what is shown in FIG. 3.

Figure 4:
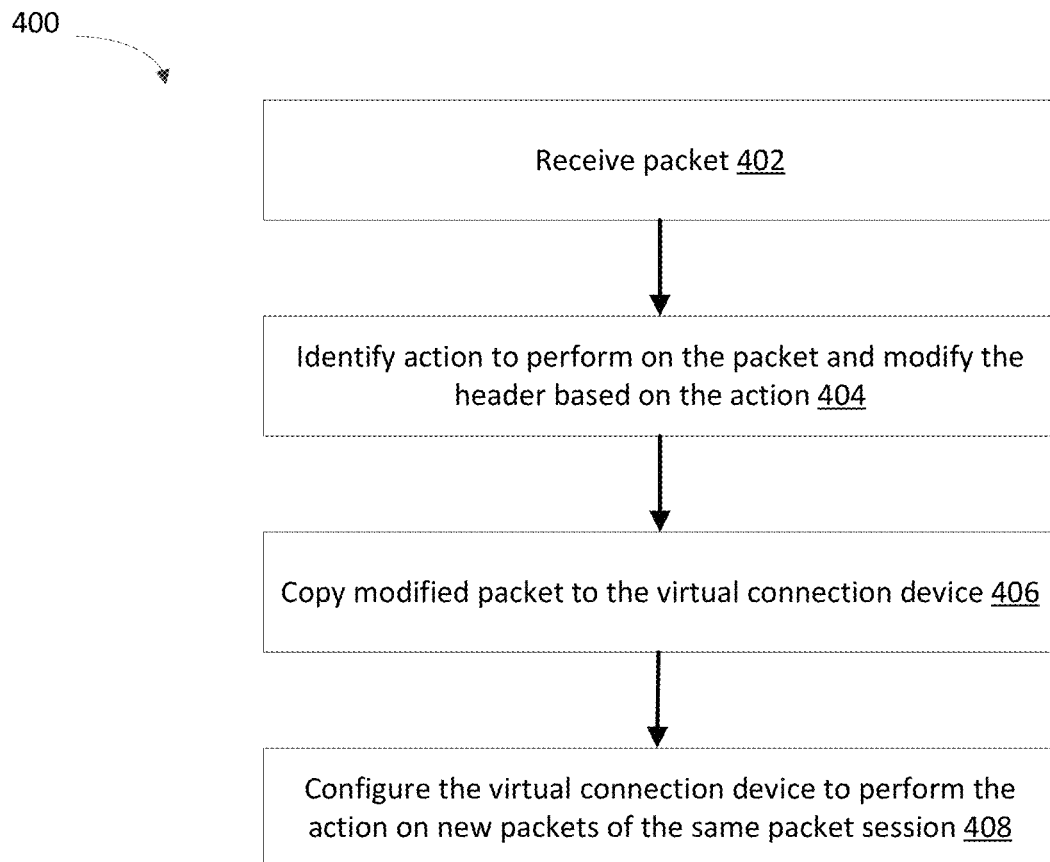
FIG. 4 is a process flow diagram of a method of configuring a packet session, in accordance with embodiments.

FIG. 4 is a process flow diagram 400 of a method of configuring a packet session, in accordance with embodiments. Method 400 may be performed by processing logic that may comprise hardware, software, firmware, or a combination thereof. In some embodiments, at least a portion of method 400 may be performed by a network function (e.g., 154A, 154N, 170) of FIG. 1 or the network function 204 of FIG. 2. The method may begin at block 402.

At block 402, a packet is received from a virtual connection device such as a virtual switch or virtual router. The packet may be received from the virtual connection device over a data plane between the network function and the virtual connection device. The packet may include a header and a payload. The header may include a source address and a destination address.

At block 404, the packet is processed to identify an action to be performed on the packet and the packet header is modified according to the identified action. For example, the packet may be analyzed to determine if the packet should be allowed through a firewall. If not, then the packet header may be modified to indicate that the packet should blocked. In some embodiments, the network function analyzes the header information to identify a subsequent destination for the packet, and the header may be modified to replace the existing destination address with the new destination address.

At block 406, the modified packet is copied to the virtual connection device over the data plane between the network function and the virtual connection device. The virtual connection device then processes the modified packet according to the modified header information by, for example, discarding the packet or sending the packet to the new destination address.

At block 408, the network function configures the virtual connection device regarding the handling of subsequent packets of the same packet session. For example, the network function can send configuration instructions over a control plane between the network function and the virtual connection device. The control plane may be implemented over a side channel of a virtual NIC that resides in the same virtual machine as the network function. Subsequent packets that are a part of the same packet session will be processed by the virtual connection device in accordance with the configuration instructions received from the network function and will be not be received by the network function.

It will be appreciated that embodiments of the method 400 may include additional blocks not shown in FIG. 4 and that some of the blocks shown in FIG. 4 may be omitted. Additionally, the processes associated with blocks 402 through 408 may be performed in a different order than what is shown in FIG. 4.

Figure 5:
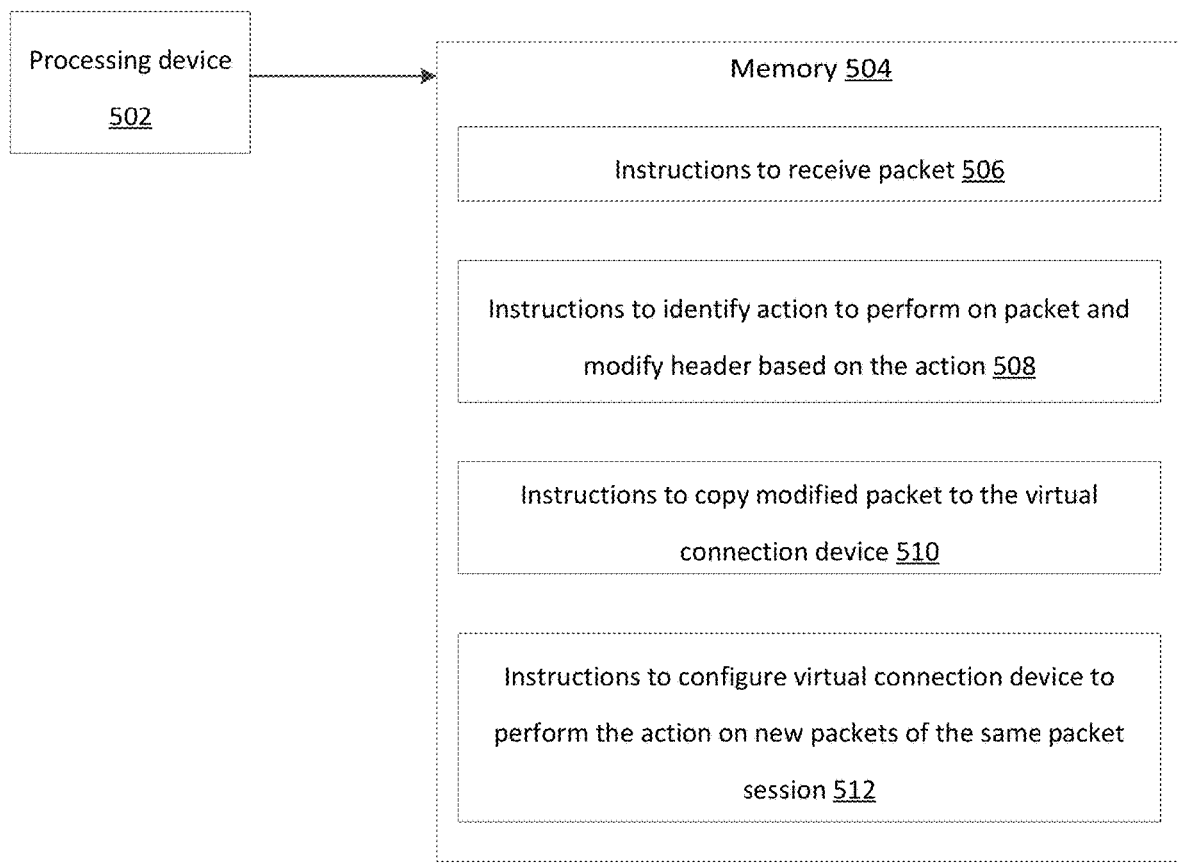
FIG. 5 is a block diagram of a system for configuring a packet session, in accordance with embodiments.

FIG. 5 is a block diagram of a system for configuring a packet session, in accordance with embodiments. The system 500 includes a processing device 502 operatively coupled to a memory 504. The memory 504 includes instructions that are executable by the processing device 502 to cause the processing device 502 to configure a packet session.

The memory 504 includes instructions 506 to receive a packet, e.g., from a virtual connection device. The memory 504 includes instructions 508 to identify an action to perform on packet and modify header based on the action. The memory 504 includes instructions 510 to copy the modified packet to the virtual connection device. The memory 504 includes instructions 512 to configure the virtual connection device to perform the action on subsequent packets of the same packet session 512.

It will be appreciated that various alterations may be made to the process illustrated in FIG. 5 and that some components and processes may be omitted or added without departing from the scope of the disclosure.

Figure 6:
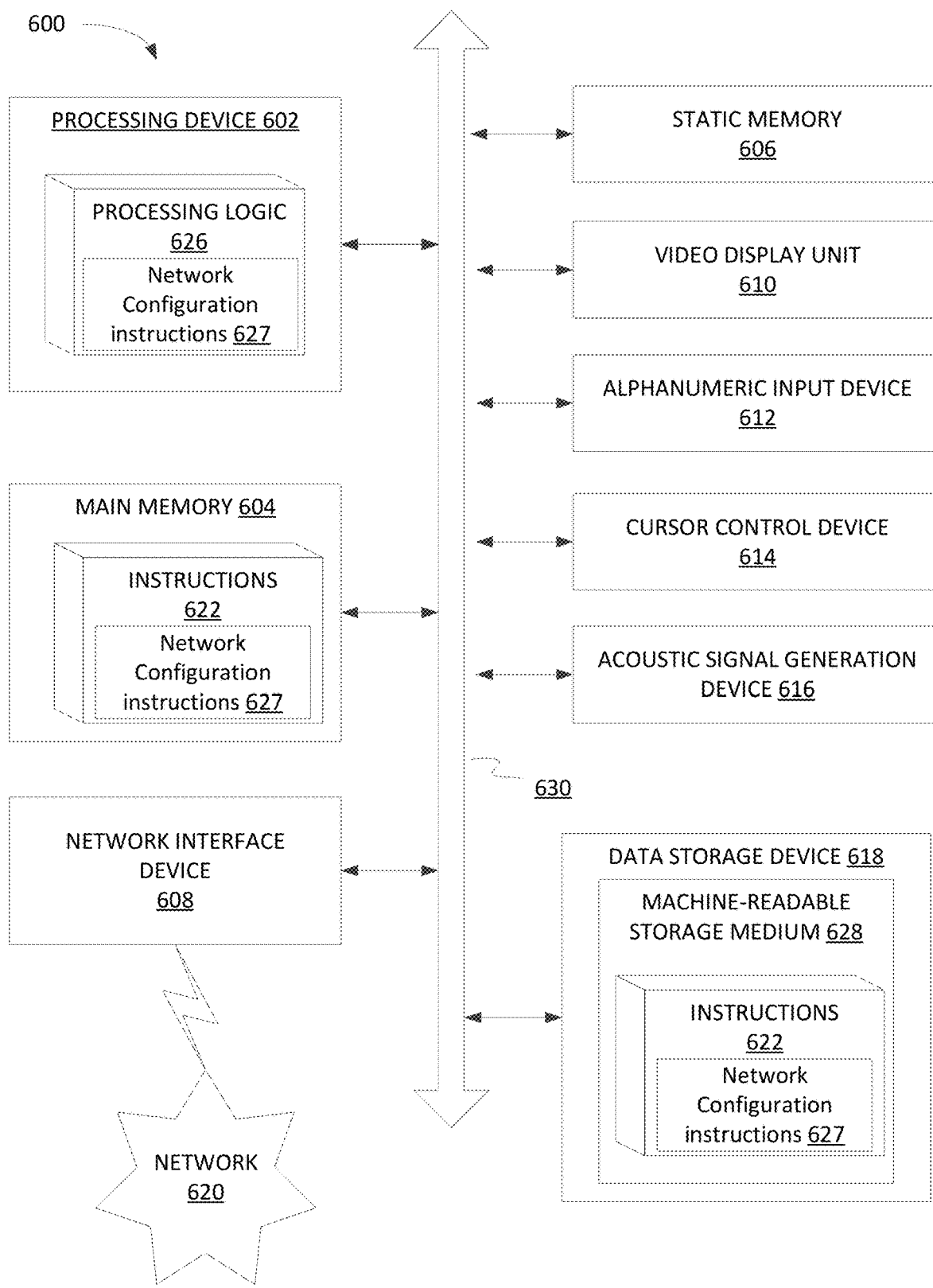
FIG. 6 is a block diagram of an example computing device that may perform one or more of the operations described herein, in accordance with some embodiments.

FIG. 6 is a block diagram of an example computing device 600 that may perform one or more of the operations described herein, in accordance with some embodiments. Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 602, a main memory 604 (e.g., synchronous dynamic random access memory (DRAM), read-only memory (ROM)), a static memory 606 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also comprise one or more special-purpose processing devices such as an application specific integrated circuit (ASIC), a field programmable gate array (FPGA), a digital signal processor (DSP), network processor, or the like. The processing device 602 may be configured to execute the operations described herein, in accordance with one or more aspects of the present disclosure, for performing the operations and steps discussed herein.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of instructions 622 that may include network configuration instructions 627 for carrying out the operations described herein, in accordance with one or more aspects of the present disclosure. Network configuration instructions 627 may also reside, completely or at least partially, within main memory 604 and/or within processing device 602 (e.g. within processing logic 626) during execution thereof by computing device 600, main memory 604 and processing device 602 also constituting computer-readable media. The network configuration instructions 627 may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
   receiving, at a network function, a packet from a virtual connection device, wherein the network function and the virtual connection device reside on a same host compute node and are communicatively coupled by a virtual network, and wherein the packet comprises a header and a payload and is part of a packet session comprising a plurality of packets;
   identifying, by the network function, an action to perform on the packet and modifying the header based on the action to create a modified packet with a modified header;
   copying the modified packet from the network function to the virtual connection device for the virtual connection device to perform the action on the modified packet based on the modified header; and
   sending, by a processing device, instructions from the network function to the virtual connection device to configure the virtual connection device to perform the action on subsequent packets of the packet session, wherein the virtual connection device performs the action on the subsequent packets without copying the subsequent packets to the network function.

2. The method of claim 1, wherein the action comprises routing the packet to a destination specified by the network function.

3. The method of claim 1, wherein the action comprises blocking the packet.

4. The method of claim 1, wherein sending the instructions from the network function to the virtual connection device comprises sending the instructions over a control plane side channel between the network function and the virtual connection device.

5. The method of claim 1, wherein the virtual connection device comprises a virtual switch.

6. The method of claim 1, wherein the virtual connection device comprises a virtual router.

7. The method of claim 1, wherein the network function resides within a virtual machine of the host compute node.

8. A system comprising:
   a memory; and
   a processing device operatively coupled to the memory, the processing device to:
      receive, at a network function, a packet from a virtual connection device, wherein the network function and the virtual connection device reside on a same host compute node and are communicatively coupled by a virtual network, and wherein the packet comprises a header and a payload and is part of a packet session comprising a plurality of packets;
      identify, by the network function, an action to perform on the packet and modify the header based on the action to create a modified packet with a modified header;
      copy the modified packet from the network function to the virtual connection device for the virtual connection device to perform the action on the modified packet based on the modified header; and
      send instructions from the network function to the virtual connection device to configure the virtual connection device to perform the action on subsequent packets of the packet session, wherein the virtual connection device performs the action on the subsequent packets without copying the subsequent packets to the network function.

9. The system of claim 8, wherein to perform the action comprises to route the packet to a destination specified by the network function.

10. The system of claim 8, wherein to perform the action comprises to block the packet.

11. The system of claim 8, wherein to send the instructions from the network function to the virtual connection device comprises to send the instructions via a control plane side channel between the network function and the virtual connection device.

12. The system of claim 8, wherein the virtual connection device comprises a virtual switch.

13. The system of claim 8, wherein the virtual connection device comprises a virtual router.

14. The system of claim 8, wherein the network function resides within a virtual machine of the host compute node.

15. A non-transitory computer-readable storage medium including instructions that, when executed by a processing device, cause the processing device to:
   receive, at a network function, a packet from a virtual connection device, wherein the network function and the virtual connection device reside on a same host compute node and are communicatively coupled by a virtual network, and wherein the packet comprises a header and a payload and is part of a packet session comprising a plurality of packets;
   identify, by the network function, an action to perform on the packet and modify the header based on the action to create a modified packet with a modified header;
   copy the modified packet from the network function to the virtual connection device for the virtual connection device to perform the action on the modified packet based on the modified header; and send, by the processing device, instructions from the network function to the virtual connection device to configure the virtual connection device to perform the action on subsequent packets of the packet session, wherein the virtual connection device performs the action on the subsequent packets without copying the subsequent packets to the network function.

16. The non-transitory computer-readable storage medium of claim 15, wherein to perform the action comprises to route the packet to a destination specified by the network function.

17. The non-transitory computer-readable storage medium of claim 15, wherein to perform the action comprises to block the packet.

18. The non-transitory computer-readable storage medium of claim 15, wherein to send the instructions from the network function to the virtual connection device comprises to send the instructions via a control plane side channel between the network function and the virtual connection device.

19. The non-transitory computer-readable storage medium of claim 15, wherein the virtual connection device comprises a virtual switch.

20. The non-transitory computer-readable storage medium of claim 15, wherein the network function resides within a virtual machine of the host compute node.

* * * * *